United States Patent
Bogdanski et al.

(10) Patent No.: US 9,577,956 B2
(45) Date of Patent: Feb. 21, 2017

(54) SYSTEM AND METHOD FOR SUPPORTING MULTI-HOMED FAT-TREE ROUTING IN A MIDDLEWARE MACHINE ENVIRONMENT

(71) Applicant: Oracle International Corporation, Redwood Shores, CA (US)

(72) Inventors: Bartosz Bogdanski, Oslo (NO); Bjørn Dag Johnsen, Oslo (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 144 days.

(21) Appl. No.: 14/226,288

(22) Filed: Mar. 26, 2014

(65) Prior Publication Data
US 2015/0030034 A1 Jan. 29, 2015

Related U.S. Application Data

(60) Provisional application No. 61/859,650, filed on Jul. 29, 2013.

(51) Int. Cl.
| | |
|---|---|
| H04L 12/56 | (2006.01) |
| H04L 12/947 | (2013.01) |
| H04L 12/735 | (2013.01) |
| H04L 12/707 | (2013.01) |
| H04L 12/931 | (2013.01) |
| H04L 12/933 | (2013.01) |

(52) U.S. Cl.
CPC ............ *H04L 49/25* (2013.01); *H04L 45/128* (2013.01); *H04L 45/24* (2013.01); *H04L 49/15* (2013.01); *H04L 49/358* (2013.01)

(58) Field of Classification Search
CPC .......... H04L 43/10; H04L 12/26; H04L 45/24; H04L 45/128; H04L 49/15; H04L 49/25
USPC ..... 709/224, 238; 370/390, 395.4, 412, 256, 370/408
See application file for complete search history.

(56) References Cited

U.S. PATENT DOCUMENTS

| | | | |
|---|---|---|---|
| 2007/0053356 A1* | 3/2007 | Konda | H04L 12/5693 370/390 |
| 2011/0080855 A1* | 4/2011 | Fung | H04L 45/04 370/256 |
| 2012/0027017 A1 | 2/2012 | Rai et al. | |
| 2012/0151090 A1* | 6/2012 | Nakashima | H04L 49/358 709/238 |
| 2013/0114620 A1 | 5/2013 | Bogdanski | |

(Continued)

OTHER PUBLICATIONS

European Patent Office, International Searching Authority, International Search Report and Written Opinion for International Patent Application No. PCT/US2014/047280 dated Nov. 14, 2014, 12 pages.

(Continued)

*Primary Examiner* — Alpus H Hsu
*Assistant Examiner* — Camquyen Thai
(74) *Attorney, Agent, or Firm* — Tucker Ellis LLP (57) ABSTRACT

A system and method can support multi-homed routing in a network environment, which can be based on InfiniBand architecture using a fat-tree or a similar topology. The system can provide an end node that is associated with a switch port on a leaf switch in a network fabric. Then, the system can perform routing for each of a plurality of ports on the end node, and ensure that the plurality of ports on the end node take mutually independent paths.

20 Claims, 4 Drawing Sheets

(56) References Cited

U.S. PATENT DOCUMENTS

2014/0101302 A1* 4/2014 Yang .................. H04L 41/0813
　　　　　　　　　　　　　　　　　　　　　　709/224
2014/0181292 A1* 6/2014 Venkataswami ........ H04L 45/04
　　　　　　　　　　　　　　　　　　　　　　709/224

OTHER PUBLICATIONS

Bartosz Bogdanski et al., "Multi-Homed fat-tree routing with InfiniBand", 2014 $22^{nd}$ Euromicro International Conference on Parallel, Distributed, and Network-Based Processing, IEEE, Feb. 12, 2014, 8 pages.

Bartosz Bogdanski et al., "sFtree: A Fully Connected and Deadlock-Free Switch-to-Switch Routing Algorithm for Fat-Trees", ACM Transactions on Architecture and Code Optimization, vol. 8, No. 4, Article 55, Publication Date Jan. 2012, 20 pages.

Laiquan Han et al., "A Novel Multipath Load Balancing Algorithm in Fat-Tree Data Center", Dec. 1, 2009, Cloud Computing, Springer Berlin Heidelberg, Berlin, Heidelberg, pp. 405-412.

International Bureau of WIPO, International Preliminary Report on Patentability (Chapter I of the Patent Cooperation Treaty) dated Feb. 2, 2016 for International Patent Application No. PCT/US2014/047280, 8 pages.

* cited by examiner

SYSTEM AND METHOD FOR SUPPORTING MULTI-HOMED FAT-TREE ROUTING IN A MIDDLEWARE MACHINE ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims priority on U.S. Provisional Patent Application No. 61/859,650, entitled "SYSTEM AND METHOD FOR SUPPORTING MULTI-HOMED FAT-TREE ROUTING IN A MIDDLEWARE MACHINE ENVIRONMENT" filed Jul. 29, 2013, which application is herein incorporated by reference.

FIELD OF THE INVENTION

The present invention is generally related to computer systems, and is particularly related to a network environment.

BACKGROUND

The fat-tree topology is used for high performance computing (HPC) clusters, and for clusters based on InfiniBand (IB) technology. For example, the fat-tree topology is used in the fastest supercomputers, such as MilkyWay-2. Also, the fat-tree IB systems include large installations such as Stampede, TGCC Curie and SuperMUC.

These are the generally areas that embodiments of the invention are intended to address.

SUMMARY

Described herein are systems and methods that can support multi-homed routing in a network environment, which can be based on InfiniBand architecture using a fat-tree or a similar topology. The system can provide an end node that is associated with a switch port on a leaf switch in a network fabric. Then, the system can perform routing for each of a plurality of ports on the end node, and ensure that the plurality of ports on the end node take mutually independent paths.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the Infiniband (IB) network as an example for a high performance network. It will be apparent to those skilled in the art that other types of high performance networks can be used without limitation. Also, the description of the invention as following uses the fat-tree topology as an example for a fabric topology. It will be apparent to those skilled in the art that other types of fabric topologies can be used without limitation.

Described herein are systems and methods that can support multi-homed routing in a network environment.
InfiniBand Architecture The InfiniBand Architecture (IBA) supports a two-layer topological division. At the lower layer, IB networks are referred to as subnets, where a subnet can include a set of hosts interconnected using switches and point-to-point links. At the higher level, an IB fabric constitutes one or more subnets, which can be interconnected using routers.

Furthermore, hosts and switches within a subnet can be addressed using local identifiers (LIDs), and a single subnet can be limited to 49151 LIDs. Besides the LIDs, which are the local addresses that are valid only within a subnet, each IB device can have a 64-bit global unique identifier (GUID) that is burned into its non-volatile memory. A GUID can be used to form a global identifier (GID), which is an IB layer three (L3) address. A GID can be created by concatenating a 64-bit subnet identifier (ID) with the 64-bit GUID to form an IPv6-like 128-bit address. For example, different port GUIDs can be assigned to the ports connected to the IB fabric.

Additionally, a subnet manager (SM) can be responsible for performing routing table calculations in an IB fabric. Here, the routing of the IB network aims at obtaining full connectivity, deadlock freedom, and proper load balancing between all source and destination pairs in the local subnet.

The SM can calculate the routing tables at network initialization time. Furthermore, the routing tables can be updated whenever the topology changes, in order to ensure optimal performance. During normal operations, the SM can perform periodic light sweeps of the network to check for topology changes. If a change is discovered during a light sweep or if a message (trap) signaling a network change is received by the SM, the SM can reconfigure the network according to the discovered changes.

For example, the SM can reconfigure the network when the network topology changes, such as when a link goes down, when a device is added, or when a link is removed. The reconfiguration steps can include the steps performed during the network initialization. Furthermore, the reconfigurations can have a local scope that is limited to the subnets, in which the network changes occurred. Also, the segmenting of a large fabric with routers may limit the reconfiguration scope.

Additionally, an IB network, which is based on a lossless networking technology, may be prone to deadlocks under certain conditions. For example, deadlocks may occur in an IB network where network resources, such as buffers or channels, are shared and packet drops are not allowed. Here, a necessary condition for a deadlock to happen is the creation of a cyclic credit dependency, which means that a cyclic credit dependency can make the deadlock occurrence possible. On the other hand, this does not mean that there will always be a deadlock whenever a cyclic credit dependency is present.

Fat-Tree Routing

The fat-tree topology can provide various benefits for supporting high performance interconnections. These benefits can include deadlock freedom, inherent fault-tolerance, and full bisection bandwidth. The deadlock freedom represents that the use of a tree structure makes it possible to route fat-trees without special considerations for deadlock avoidance. The inherent fault-tolerance represents that the existence of multiple paths between individual source destination pairs makes it easier to handle network faults. The full bisection bandwidth represents that the network can sustain full speed communication between the two halves of the network.

Furthermore, fat-tree routing algorithms can be used to support the efficient use of the underlying fat-tree topology. The following Algorithm 1 is an exemplary fat-tree routing algorithm.

---
Algorithm 1 route_to_cns( ) function
---

```
Require: Addressing is completed
Ensure: All hca_ports are routed
1: for swleaf = 0 to max_leaf_sw do
2:      for swleaf.port = 0 to max_ports do
3:          hca_lid = swleaf.port-> remote_lid
4:          swleaf.routing table[hca_lid] = swleaf.port
5:          route_downgoing_by_going_ up( )
6:      end for
7: end for
```

As shown in the above, the routing function, route_to_cns( ) can iterate over an array of leaf switches (Lines 1-7). For each selected leaf switch, the routing function can route toward each end-node port that is connected to the selected leaf switch, e.g. in the port numbering sequence (Lines 2-6).

Furthermore, when routing an end-node port that is associated with a particular LIDs, the routing function can go up one level in the network topology to route the downgoing paths, and when routing each switch port, the routing function can go down to route the upgoing paths. This process can be repeated until the root switch level is reached. After that the paths towards all nodes are routed and inserted into the linear forwarding tables (LFTs) of all switches in the fabric.

For example, the route_downgoing_by_going_up( ) function (Line 5) can be a recurrence function that can balance the paths and call the route_upgoing_by going_down( ) function, which routes the upward paths in the fat-tree toward destination through the switch from which the route_downgoing_by_going_up( ) function was invoked.

There can be several potential drawbacks associated with the route_to_cns( ) function. First, the route_to_cns( ) function is oblivious and routes the end-ports without any consideration as to which end-node the end-ports belong. Second, the route_to_cns( ) function depends on the physical port number for routing.

Figure 1:
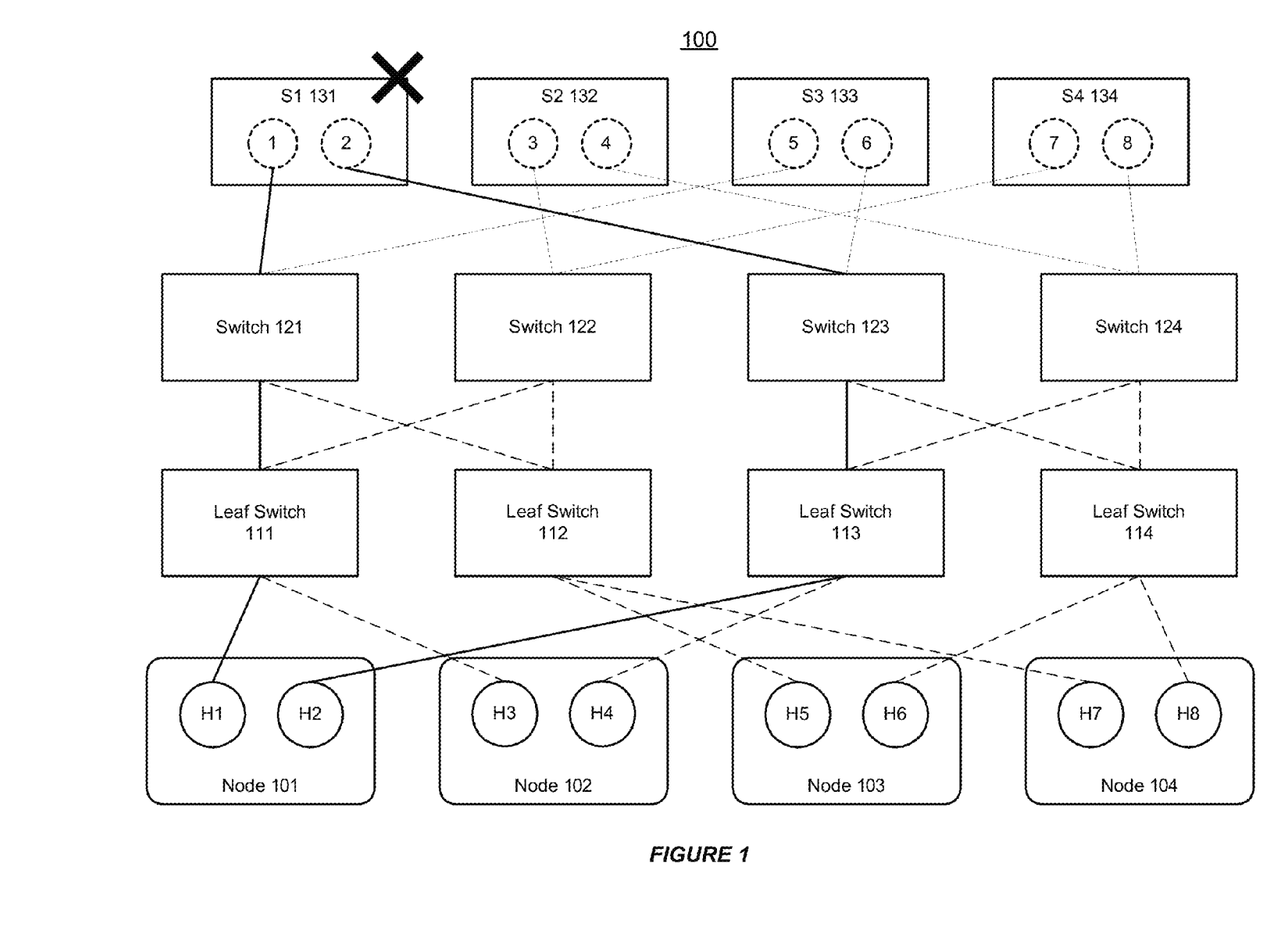
FIG. 1 shows an illustration of supporting fat-tree routing in a network environment.

FIG. 1 shows an illustration of supporting fat-tree routing in a network environment. As shown in FIG. 1, one or more end nodes 101-104 can be connected to a network fabric 100. The network fabric 100 can be based on a fat-tree topology, which includes a plurality of leaf switches 111-114, and multiple spine switches or root switches 131-134.

Additionally, the network fabric 100 can include one or more intermediate switches, such as switches 121-124.

Also as shown in FIG. 1, each of the end nodes 101-104 can be a multi-homed node, i.e. a single node that is connected to two or more parts of the network fabric 100 through multiple ports. For example, the node 101 can include the ports H1 and H2, the node 102 can include the ports H3 and H4, the node 103 can include the ports H5 and H6, and the node 104 can include the ports H7 and H8.

Additionally, each switch can have multiple switch ports. For example, the root switch S1 131 can have the switch ports 1-2, the root switch S2 132 can have the switch ports 3-4, the root switch S3 133 can have the switch ports 5-6, and the root switch S4 134 can have the switch ports 7-8.

Using a fat-tree routing algorithm, such as Algorithm 1, which routes on leaf switch basis, there is no guarantee that independent routes will be assigned to different two-port nodes 101-104. For example, the ports H1, H2, H5 and H6 can be connected to port 1 on each switch (not shown), while the ports H3, H4, H7 and H8 are connected to port 2 on each switch (not shown). Here, after routing through four end-ports and traversing through the leaf switch 113 and the switch 123, the fat-tree routing algorithm may assign the two paths from the pair of end-ports, H1 and H2 on node 101, to the same leftmost root switch S1 131 (via switch ports 1-2 respectively). Similarly, other pair of end-ports, e.g. H3 and H4 on node 102, H5 and H6 on node 103, and H7 and H8 on node 104, may be routed through the same root switch (i.e. S2 132-S4 134 respectively).

This can result in an undesirable behavior for a user. As shown in FIG. 1, the end node 101 can have a single point of failure at the root switch S1 131, even though the end node 101 may have built-in physical fault-tolerance (i.e. two end-ports connected to different leaf switches 111 and 113) has. Additionally, depending on the physical cabling, similar problems may appear and the single point of failure may occur on other switches in the fat-tree topology.

Furthermore, within the network fabric 100, the traffic to different ports on the same node may be routed through a single link. Thus, this single link may represent both an additional single point of failure for the set of end ports, and a performance bottleneck (since the traffic targeting different end ports may effectively only be able to utilize the bandwidth of the single shared link).

Multi-Homed Fat-Tree Routing

In accordance with an embodiment of the invention, the system can provide independent routes for multi-homed nodes in fat-trees, so that a single point of failure may not lead to complete outage.

Figure 2:
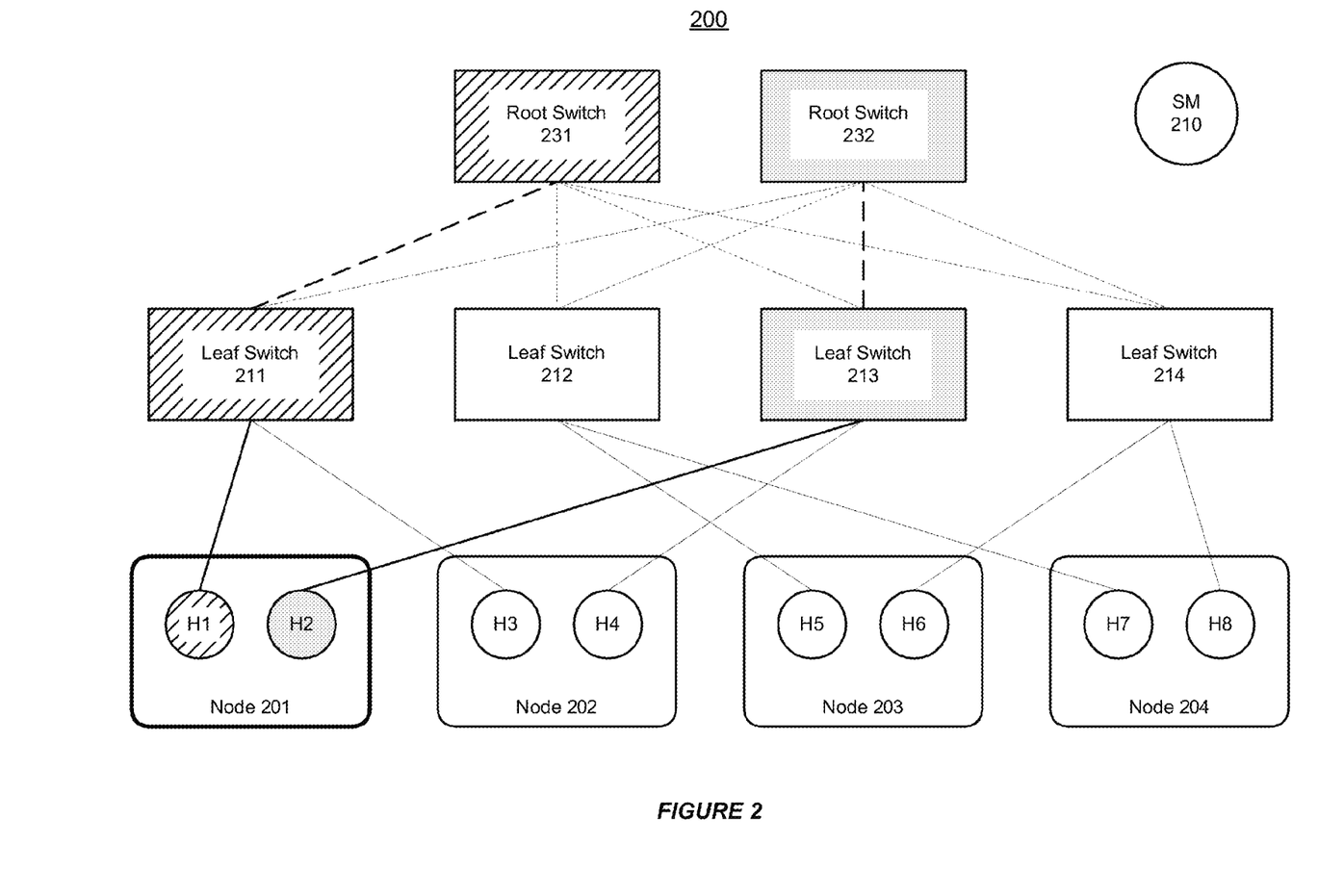
FIG. 2 shows an illustration of supporting multi-homed routing in a network environment, in accordance with an embodiment of the invention.

FIG. 2 shows an illustration of supporting multi-homed routing in a network environment, in accordance with an embodiment of the invention. As shown in FIG. 2, a network environment can comprise a plurality of end nodes (e.g. nodes 201-204), each of which can include one or more ports (e.g. ports H1-H8). Additionally, the plurality of end nodes 201-204 can connect to a network fabric 200, which can be in a fat-tree topology. Also, the network fabric 200 can include a plurality of switches, e.g. the leaf switches 211-214 and the root switches, S1 231 and S2 232.

In accordance with an embodiment of the invention, a multi-homed fat-tree routing algorithm, such as the mFtree algorithm, can be used for performing the fat-tree routing, e.g. by a subnet manager (SM) 210. In the example as shown in FIG. 2, the mFtree algorithm can identify the paths from the port H1 and the port H2 on node 201 may need to be routed in a mutually redundant way, since both ports locate on a single end node 1.

Furthermore, the mFtree algorithm can ensure that the paths are in fact redundant. For example, the path from the port H1 on node 201 can go through the leaf switch 211 and eventually leads to a root switch 231. As shown in FIG. 2, the system can mark the switches in the path (as shown in dark shading). Then, the system can avoid using the marked switches for determining the path from the port H2 on node 201. Thus, the path from the port H2 on node 201 can go through a redundant path (e.g. via the leaf switch 213) and eventually leads to a different root switch 232 (as shown in light shading).

When the routing step for the node 201 is completed, the algorithm can mark the node as routed (as shown in bold line), so that the routing step is not repeated for the node 201 when the algorithm encounters another port of that node. Thus, the system can ensure that a single point of failure does not lead to a complete outage of a multi-port node.

Additionally, the fat-tree routing algorithm can provide improvements in performance, scalability, availability and predictability of InfiniBand (IB) fat-tree topologies.

The following Algorithm 2 is an exemplary multi-homed fat-tree routing algorithm.

---
Algorithm 2 route_multihomed_cns( ) function
---
Require: Addressing is completed
Ensure: All hca_ports are routed through independent spines
1: for swleaf = 0 to leaf_sw_num do
2:     for swleaf.port = 0 to max_ports do
3:         hca_node = swleaf.port -> remote_node
4:         if hca_node.routed == true then
5:             continue
6:         end if
7:         route hcas(hca_node)
8:     end for
9: end for
---

As shown in the above, Algorithm 2, which is a multi-homed routing algorithm, can iterate over all leaf switches, and then can iterate over all leaf switch ports for each leaf switch (Lines 1-9). Thus, Algorithm 2 can be deterministic, which is similar to Algorithm 1.

Furthermore, Algorithm 2 can take a switch port on a leaf switch in order to find an end node that is associated with the switch port (Line 3). Unlike Algorithm 1, which simply takes the LID of the remote port connected to the leaf switch, Algorithm 2 can take the end node as a parameter for performing the routing calculation (Line 7).

The following Algorithm 3 is an exemplary algorithm for routing a single end-node in a fat-tree.

---
Algorithm 3 route hcas(hca) function
---
Require: Node that is to be routed
Ensure: All hca_ports belonging to the node with hca_lid are routed
1: for hca_node.port = 0 to port_num do
2:     hca_lid = hca_node.port -> lid
3:     swleaf = hca_node.port -> remote_node
4:     swleaf.port = hca_node.port -> remote_port_number
5:     swleaf.routing_table[hca_lid] = swleaf.port
6:     route_downgoing_by_going_up( )
7: end for
8: hca_node.routed = true
9: clear_redundant_flag( )
---

As shown in the above, Algorithm 3 can iterate over all ports on a selected end-node (Lines 1-7). For example, Algorithm 3 can route each port on the selected end-node using a modified version of the route_downgoing_by_ going_up( ) function (Line 6). When all ports on the selected end node are routed, the routing algorithm can mark the selected end-node as routed (Line 8), so that end-node is not routed when it is encountered on another leaf switch. Also, Algorithm 3 can improve the performance of the system in various situations (For example, Algorithm 3 can save half of the loop iterations for a two-port node).

Additionally, Algorithm 3 may be applied to both a scenario with multiple ports on a single host channel adapter (HCA) and a scenario with multiple ports on two or more HCAs. The algorithm can use different methods for identifying ports on the single HCA or on multiple HCAs (or any end ports) on the same logical node. Here, a node can be a physical or virtual server, an IO device, or any kind of end node connected to the IB fabric via one or more HCA ports.

Furthermore, Algorithm 3 can route each port on the selected node and mark each switch on the path using a flag. Thus, Algorithm 3 can choose different switches for different ports on the same end node. Afterwards, the algorithm can flip the flag on all switches so that the algorithm can progress on the next node.

Additionally, the system can be optimized by clearing the switch redundancy flag in the clear_redundant_flag( ) function (Line 9). Instead of using a loop in this function, which iterates over all the switches regardless whether a particular switch was on the path or not, an optimized way for clearing the switch redundancy flag is to create a list of switches that are on the path and making sure that the clear_redundant_flag( ) function only iterates on those switches in the list.

The following Algorithm 4 is an exemplary algorithm for routing a single end-node port in a fat-tree.

---
Algorithm 4 route downgoing by going up( ) function
---
Require: Current hop switch
Ensure: Best effort is done to find an upward redundant switch
Ensure: Switches on the path are marked with a redundant
1: groupmin = 0
2: redundant_group = 0
3: for port_group = 0 to port_group_num do
4:     if groupmin == 0 then
5:         if groupmin -> remote_node.redundant then
6:             groupmin = port_group
7:         end if
8:     else if port_group.cntdown < groupmin.cntdown then
9:         groupmin = port_group
10:        if groupmin -> remote_node.redundant then
11:            min redundant group = groupmin
12:        end if
13:    end if
14: end for
15: if groupmin == 0 then
16:     fallback_normal_routing(hca_lid)
17: else if groupmin -> remote node.redundant then
18:     groupmin = min_redundant_group
19:     groupmin -> remote_node.redundant = false
20: end if
---

As shown in the above, the modified version of the route_downgoing_by_going_up( ) function in Algorithm 4 treats redundancy as the primary consideration. Unlike Algorithm 1, in which the port group with the lowest downward counters is selected, Algorithm 4 may only choose an upward node of an end node as the next-hop if it does not route any other ports belonging to the end-node (i.e., when the redundant flag is true).

Here, the redundant flag is cleared before the next end-node is routed. If there are no nodes that are redundant as may happen in heavily oversubscribed fabrics or in case of link failures, mFtree falls back to normal fat-tree routing, in which case a user may observe that this routing function perform similar to the routing function presented in Algorithm 1.

Additionally, when there are no alternative switches and parallel links exist between two switches, the above Algorithm 4 is able to select different links for different target ports on the same end node, in order to support for both performance/load-spreading and link level redundancy. On the other hand, in the case when the performance has a priority, the separate links may be chosen for different target ports on the same end node only when both links has the same level of load.

Figure 3:
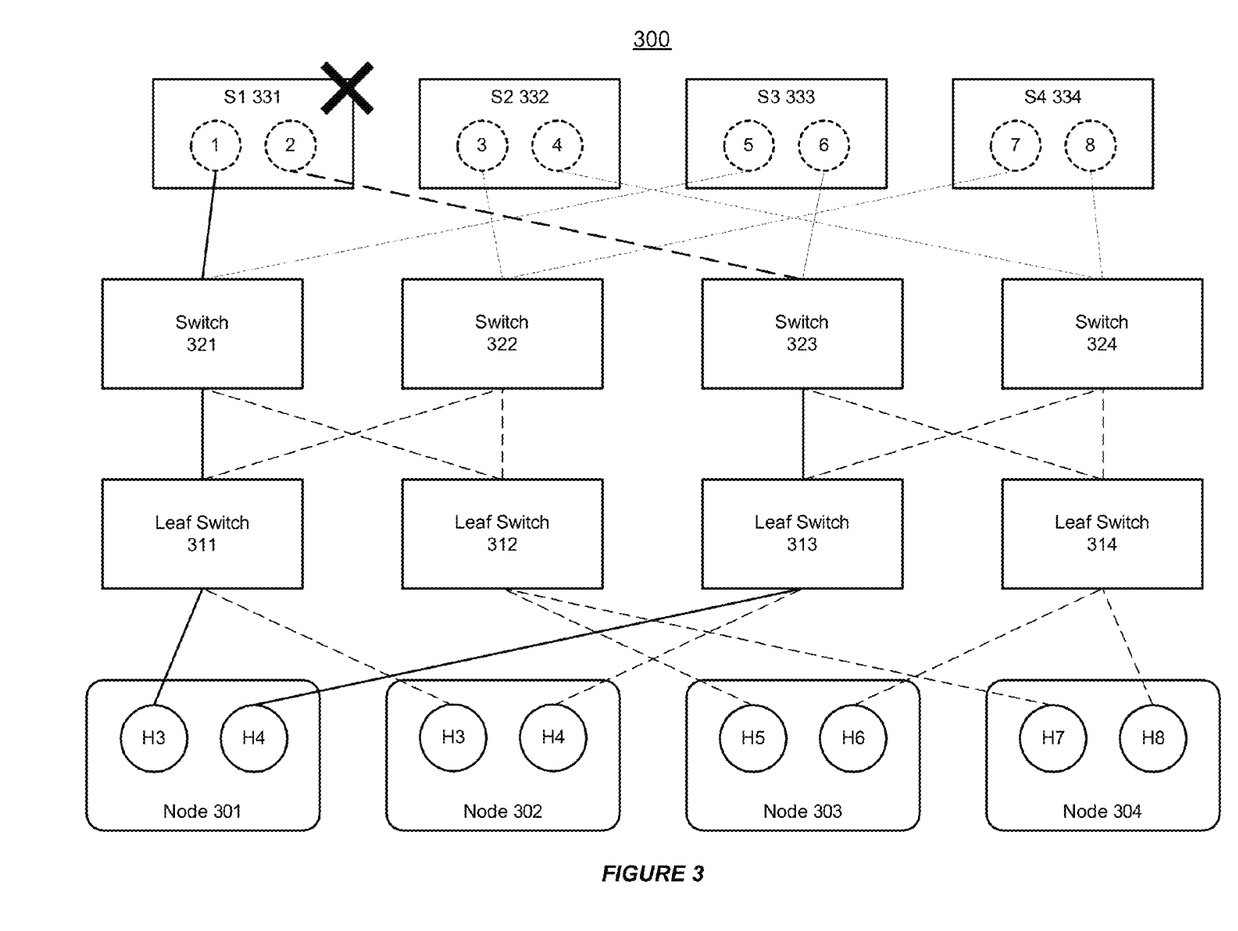
FIG. 3 shows an illustration of providing redundancy for supporting a fat-tree routing in a network environment, in accordance with an embodiment of the invention.

FIG. 3 shows an illustration of providing redundancy for supporting a fat-tree routing in a network environment. As shown in FIG. 3, one or more multi-homed end nodes 301-304 can be connected to a network fabric 300. The network fabric 300, which is based on a fat-tree topology, can include a plurality of leaf switches 311-312, and multiple spine switches or root switches S1 331-S4 334. Additionally, the network fabric 300 can include one or more intermediate switches, such as switches 321-324.

Also as shown in FIG. 3, the node 301 can include the ports H1 and H2, the node 302 can include the ports H3 and H4, the node 303 can include the ports H5 and H6, and the node 304 can include the ports H7 and H8. Additionally, the root switch S1 331 can have the switch ports 1-2, the root switch S2 332 can have the switch ports 3-4, the root switch S3 333 can have the switch ports 5-6, and the root switch S4 334 can have the switch ports 7-8.

The multi-homed routing, such as the mFtree algorithm, can route each multi-homed node 301-304 in a way that the paths to each port on a node are exclusive, i.e. the mFtree algorithm makes sure that each port on a multi-homed node is reachable through an independent path. Additionally, the mFtree algorithm can improve the network performance.

Furthermore, in the case of a single multi-homed end-node, the mFtree algorithm can ensure that no single link is shared by paths to any pair of ports belonging to the same end node. Also, when there is concurrent traffic from different source ports to different ports on the same destination node in the network fabric 300, the mFtree algorithm can ensure that the concurrent traffic is not sharing any intermediate link when an alternative route exists.

Thus, using the mFtree algorithm, a failure of a single device, such as the spine switch S1 331 in the fabric 300, may not cause the node 301 to be disconnected, because the paths to the different ports do not converge at the single spine switch S1 331.

Additionally, the mFtree algorithm treats each port on a same node as a separate and independent entity. Thus, the mFtree algorithm can route on a node-basis instead of on a port-basis, and the mFtree algorithm can address the different characteristics that different end nodes may have.

Figure 4:
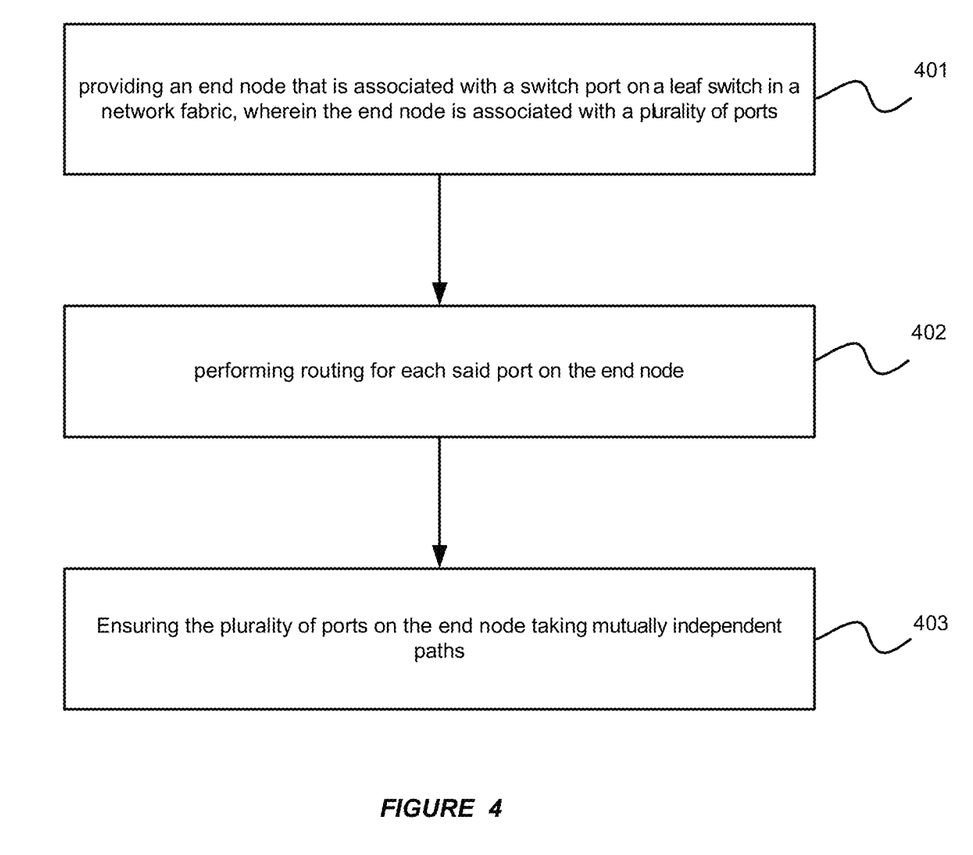
FIG. 4 illustrates an exemplary flow chart for supporting multi-homed routing in a network environment, in accordance with an embodiment of the invention.

FIG. 4 illustrates an exemplary flow chart for supporting multi-homed routing in a network environment, in accordance with an embodiment of the invention. As shown in FIG. 4, at step 401, the system can provide an end node that is associated with a switch port on a leaf switch in a network fabric, wherein the end node is associated with a plurality of ports. Then, at step 402, the system can perform routing for each said port on the end node. Furthermore, at step 403, the system can ensure that the plurality of ports on the end node take mutually independent paths The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The modification and variation include any relevant combination of the described features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting multi-homed routing in subnet of a network environment comprising a plurality of root switches connected to a plurality of leaf switches connected to a plurality of end nodes each having first and second ports wherein each of said first and second ports is directly connected to different leaf switch of the plurality of leaf switches, the method comprising:

provideing a subnet manager for said subnet;

discovering, by said subnet manager, the plurality of root switches, the plurality of leaf switches and the plurality of end nodes and a plurality of physical connections between the plurality of root switches, the plurality of leaf switches and the ports of the plurality of end nodes;

for each pair of said plurality of end nodes, automatically calculating, by said subnet manager, a first path between said pair of end nodes through said plurality of root switches and said plurality of leaf switches, marking each leaf switch and root switch on said first path between said pair of end nodes, and automatically calculating, by said subnet manager, a second path between said pair of end nodes, while preventing said second path between said pair of end nodes from using said each marked leaf switch and root switch on said first path, whereby the first path and second path between each said pair of end nodes are mutually independent paths through different root switches and leaf switches of said plurality of root switches and plurality of leaf switches; and configuring the network environment in accordance with said first and second paths calculated for each pair of said plurality of end nodes.

2. The method according to claim 1, wherein:
connections between said plurality of root switches, plurality of leaf switches, and plurality of end nodes are based on a fat-tree topology.

3. The method according to claim 2, further comprising:
allowing each end node of said plurality of end nodes to be a multi-homed node that is connected to two or more parts of the fat-tree topology through multiple ports.

4. The method according to claim 1, wherein:
each first path between each pair of said plurality of end nodes connects the first ports of said pair of said plurality of end nodes; and
each second path between each pair of said plurality of end nodes connects the second ports of said pair of said plurality of end nodes.

5. The method according to claim 1, further comprising:
allowing another path associated with another port in the plurality of ports on the end node to use one or more marked switches when there is no redundant switch, and
selecting independent links for different target ports on the same end node, when parallel links exist on the one or more marked switches.

6. The method according to claim 1, wherein:
said automatically calculating implements a fat-tree routing algorithm which takes end node identities as a parameter.

7. The method according to claim 1, further comprising:
associating each mutually independent first and second path between each said pair of end nodes with a different spine switch.

8. The method according to claim 1, further comprising:
marking each end node of the plurality of end nodes as a routed end node after completing the routing of the first and second ports on the end node.

9. The method according to claim 8, further comprising:
preventing each end node of the plurality of end nodes from being routed again, when the end node encounters another leaf switch.

10. The method according to claim 1, wherein:
said automatically calculating utilizes a routing algorithm which takes end node identity as a parameter.

11. A system for supporting multi-homed routing in a network environment comprising a plurality of root switches connected to a plurality of leaf switches connected to a plurality of end nodes each having first and second ports wherein each of said first and second ports is directly connected to different leaf switch of the plurality of leaf switches, the system comprising:
one or more microprocessors,
a subnet manager running on the one or more microprocessors, wherein the subnet manager is configured to:
discover the plurality of root switches, the plurality of leaf switches and the plurality of end nodes and a plurality of physical connections between the plurality of root switches, the plurality of leaf switches and the ports of the plurality of end nodes;
for each pair of said plurality of end nodes,
automatically calculate a first path between said pair of end nodes through said plurality of root switches and said plurality of leaf switches,
mark each leaf switch and root switch on said first path between said pair of end nodes, and
automatically calculate a second path between said pair of end nodes, while preventing said second path between said pair of end nodes from using said each marked leaf switch and root switch on said first path,
whereby the first path and second path between each said pair of end nodes are mutually independent paths through different root switches and leaf switches of said plurality of root switches and plurality of leaf switches; and
configure the network environment in accordance with said first and second paths calculated for each pair of said plurality of end nodes.

12. The system according to claim 11, wherein:
the network environment comprises a network fabric based on a fat-tree topology.

13. The system according to claim 12, wherein:
each end node of the plurality of end nodes is a multi-homed node that is connected to two or more parts of the fat-tree topology through said first and second ports.

14. The system according to claim 11, wherein:
each first path between each pair of said plurality of end nodes connects the first ports of said pair of said plurality of end nodes; and
each second path between each pair of said plurality of end nodes connects the second ports of said pair of said plurality of end nodes.

15. The system according to claim 11, wherein:
the subnet manager operates to
allow another path associated with another port in the plurality of ports on the end node to use one or more marked switches when there is no redundant switch, and
select independent links for different target ports on the same end node, when parallel links exist on the one or more marked switches.

16. The system according to claim 14, wherein:
the subnet manager is configured to use a fat-tree routing algorithm which takes end node identities as a parameter to automatically calculate said first path and said second path for said each pair of said plurality of end nodes.

17. The system according to claim 11, wherein:
each mutually independent path between a pair of the plurality of end nodes is associated with a different spine switch.

18. The system according to claim 11, wherein:
the subnet manager is configured to mark each end node of the plurality of end nodes as a routed end node after completing the routing of the first and second ports on the end node.

19. The system according to claim 18, wherein:
the subnet manager is configured to prevent the plurality of end nodes from being routed again, when the end node encounters another leaf switch.

20. A non-transitory machine readable storage medium having instructions stored thereon for supporting multi-homed routing in subnet of a network environment comprising a plurality of root switches connected to a plurality of leaf switches connected to a plurality of end nodes each having first and second ports wherein each of said first and second ports is directly connected to different leaf switch of the plurality of leaf switches, which instructions, when executed, cause a computer system to perform steps comprising:
providing a subnet manager for said subnet;
discovering, by said subnet manager, the plurality of root switches, the plurality of leaf switches and the plurality of end nodes and a plurality of physical connections between the plurality of root switches, the plurality of leaf switches and the ports of the plurality of end nodes;

for each pair of said plurality of end nodes,
- automatically calculating, by said subnet manager, a first path between said pair of end nodes through said plurality of root switches and said plurality of leaf switches,
- marking each leaf switch and root switch on said first path between said pair of end nodes, and
- automatically calculating, by said subnet manager, a second path between said pair of end nodes, while preventing said second path between said pair of end nodes from using said each marked leaf switch and root switch on said first path,
- whereby the first path and second path between each said pair of end nodes are mutually independent paths through different root switches and leaf switches of said plurality of root switches and plurality of leaf switches; and configuring the network environment in accordance with said first and second paths calculated for each pair of said plurality of end nodes.

* * * * *

UNITED STATES PATENT AND TRADEMARK OFFICE
CERTIFICATE OF CORRECTION

PATENT NO. : 9,577,956 B2  Page 1 of 1
APPLICATION NO. : 14/226288
DATED : February 21, 2017
INVENTOR(S) : Bogdanski et al.

It is certified that error appears in the above-identified patent and that said Letters Patent is hereby corrected as shown below:

In the Specification

In Column 3, Line 35, after "cns( )" insert -- , --.

In Column 3, Line 52, delete "by going" and insert -- by_going --, therefor.

In Column 7, Line 63, after "paths" insert -- . --.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*